Figure 4:
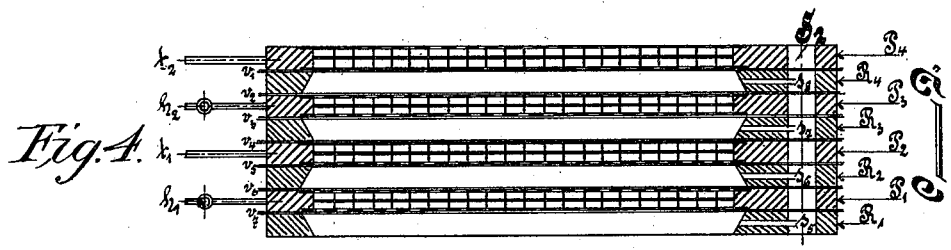
Figure 3:
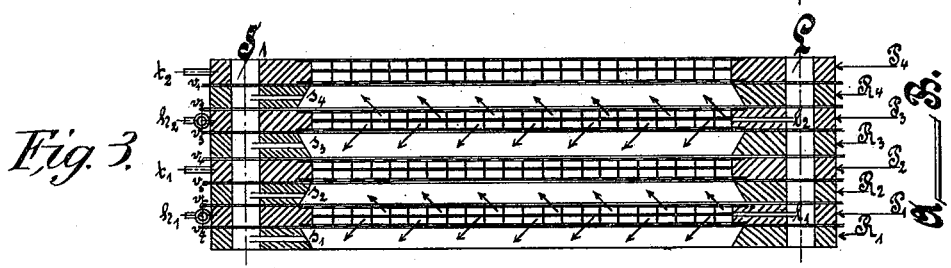
Figure 1:
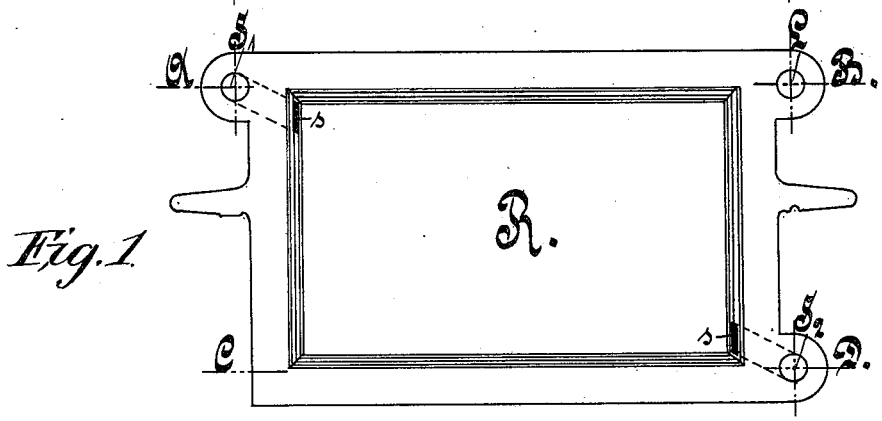
Figure 2:
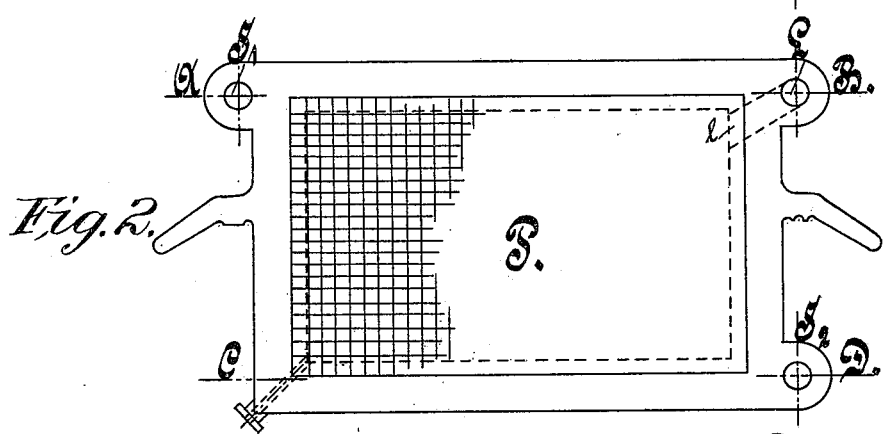

No. 650,741. Patented May 29, 1900.
M. ZAHN.
PROCESS OF WASHING PRECIPITATES IN FILTER PRESSES.
(Application filed July 7, 1899.)

(No Model.)

UNITED STATES PATENT OFFICE.

MAX ZAHN, OF ARTERN, GERMANY.

PROCESS OF WASHING PRECIPITATES IN FILTER-PRESSES.

SPECIFICATION forming part of Letters Patent No. 650,741, dated May 29, 1900.

Application filed July 7, 1899. Serial No. 723,074. (No specimens.)

*To all whom it may concern:*

Be it known that I, MAX ZAHN, manufactory manager, a subject of the King of Prussia, German Emperor, residing at Artern, in the Kingdom of Prussia, German Empire, have invented certain new and useful Improvements in Processes of Washing Precipitates in Filter-Presses, of which the following is a specification.

The present invention relates to an improved method of filtering any suitable materials in filter-presses with the object of producing uniformly-compacted deposit-cakes and to subsequently separate two or more substances contained in the deposit. More especially, this method relates to the treatment of such precipitates which are apt to be broken and easily detached from the frames or are readily soluble in the washing liquid. In all these cases it is very difficult to wash out such cakes, as the rinsing liquid rapidly passes through end rents, openings, and free spaces without producing the desired effect and without depriving such precipitate of the accompanying liquor. As an example for such a precipitation may be mentioned sugar-lime, which is partly soluble in water and readily becomes broken and fissured and separates easily from the inner sides of the filter-press frames. It belongs, therefore, to those precipitates which are especially difficult to wash and clean. In order to edulcorate this substance or the like, according to the present invention, compressed air or gas is caused to strike or act upon the precipitated cake from one side before its treatment with the rinsing liquid. This sudden air shock acts on the cake and compresses it, making it homogeneous and compact, and at the same time drives the cake tightly against the sides of the frame, thus avoiding fissures and cracks being formed in it or between it and the sides of the frame, and permits as well the easy separation thereof. In acting on one side of the cake the shock of air causes the cake to separate on this side from the filter-cloth, thereby producing a free space between the cake and the latter. In this case the washing or rinsing liquid is introduced in the form of a not too clear solution, but a liquid, which contains substances suspended in it. Preference is given to those substances which either are identical with or indifferent to the precipitate. As to the aforesaid example in the precipitation of sugar-lime, there will be used a liquid which contains sugar-lime or slaked lime or clay in suspension. If the precipitate is somewhat soluble in the rinsing liquid, the latter cannot dissolve away any cavities or recesses in the cake, as the suspended material will be deposited in every cavity and stop it up. By means of the sudden air-pressure followed by the rinsing liquid which contains suspended material there is therefore obtained a cake forming a compact and uniform mass which adheres tightly to the frame sides and is uniformly penetrated and washed by the washing liquid. The accompanying drawings illustrate this process.

Figure I shows a frame R; Fig. II, a plate P of the press in elevation. Figs. III and IV are horizontal sections of several frames and plates as arranged in a filter-press.

$P'$ $P^2$ $P^3$ $P^4$ are plates. $R'$ $R^2$ $R^3$ $R^4$ are frames. The frames and plates are arranged alternately in the press and are separated by means of filter-cloth $v'$ $v^2$ $v^3$ $v^4$ $v^5$ $v^6$ $v^7$. The plates are provided alternately with cocks and sockets, respectively. In the present case the plates $P'$ $P^3$ are provided with cocks $h'$ $h^2$ and the plates $P^2$ $P^4$ with sockets or tubes $t'$ $t^2$. The frames and plates are arranged alternately in the press and are provided with orifices or passages $S'$, $S^2$, and L, Figs. III and IV, which passages, when the press is fitted up, form conduits which are likewise lettered $S'$, $S^2$, and L, Figs. I and II. The passages $S'$ and $S^2$ communicate with the interior spaces of the frames $R'$ $R^2$ $R^3$ $R^4$ by means of passages $S'$ $S^2$ $S^3$ $S^4$ $S^5$ $S^6$ $S^7$ $S^8$.

The operation of the press is as follows: The liquid to be filtered enters by means of the conduits $S'$ $S^2$ and passages $s'$ $s^2$ $s^3$ $s^4$ $s^5$ $s^6$ $s^7$ $s^8$ into the interior of the frames $R'$ $R^2$ $R^3$ $R^4$. The precipitate or solid matter is deposited or retained there, while the liquid free from the solid matter passes through the several filtering-cloths into the free spaces of the plates $P'$ $P^2$ $P^3$ $P^4$, leaving the apparatus by way of the taps and nozzles. As soon as the frames are filled with the precipitate or solid matter the inlet for the liquid to be filtered is closed, as also are the passages $S'$ $S^2$. The taps $h'$ $h^2$ are also closed and a valve in the passage which communicates with the conduit L is opened, through which valve compressed air or compressed gas enters into said conduit L. The air passing through the passages $l'$ $l^2$ into the interior free space of the plates $p'$ $p^2$ presses on the cakes contained in the frames $R'$ $R^2$ $R^3$ $R^4$ in the direction shown by the arrows, packing or condensing the same more closely and against the inner sides of the frames, which are so constructed that the spaces grow narrower in the direction of the current of air with a view of increasing the effect of the pressure. By this shock of air the cakes separate from the filter-cloth $v^2$ $v^3$ $v^6$ $v^7$, forming thus free spaces between them and the respective cloths. After having closed the air-valve again the rinsing liquid, containing solid suspended material, is introduced through the channels $S'$ $S^2$ directly into the press. Passing through the passages $S'$ $S^2$ $S^3$ $S^4$ to $S^8$ it enters the free spaces between the cakes and the filter-cloths $v^2$ $v^3$ $v^6$ $v^7$, penetrating or passing through the cakes in passing from the filter-cloth $v^2$ to the filter-cloth $v'$, from $v^3$ to $v^4$, and from $v^6$ to $v^5$, then flowing through the free spaces of the plates $P^2$ $P^4$ and leaving the press through the nozzles $t'$ $t^2$.

The process just described is of special use in cases where the cakes contain two or more substances of which it is desirable to eliminate one or more by means of a solvent. Suppose, for instance, a solution is used which contains iron and chrome, the hydroxids of which have been precipitated and the precipitate separated in a filter-press. It may be necessary to eliminate the chrome hydroxid either to obtain the valuable chrome itself or to obtain ferric hydrate to be used as a coloring material. In this case the process is as follows: After the cakes have been treated by compressed air in the aforesaid manner, whereby a free space between the cakes and filter-cloth has been formed, a solution of sodium hydroxid containing ferric hydroxid suspended in it is introduced into said space. The sodium hydroxid penetrates the cakes and dissolves the chrome hydroxid. The suspended ferric hydrate becomes deposited in the holes formed by the dissolving of the chrome hydroxid, thereby forming a uniform and compact precipitate which does not contain fissures or holes through which the sodium hydroxid could pass. An analogous process serves to separate also other precipitates in the filter-press.

What I claim as my invention is—

1. The method of producing uniformly-compacted deposit-cakes in a filter-press in which the cakes are made, which consists in subjecting the cakes to the impact of a sudden shock of air passed against the interior sides of the plate, thereby detaching said cakes on one side from the filter-cloth, whereby a free space between the cakes and the cloth is produced, and then introducing into such space a rinsing liquid having solid substances suspended in it, substantially as described.

2. The method of separating two or more substances contained in the precipitate or deposit of a filter-press, which consists in introducing into the filter-press and passing through the deposit therein, a liquid which is a solvent of the body that is to be eliminated, said liquid having suspended therein particles of the substance which is to be retained in the press, substantially as described.

In testimony whereof I have hereunto set my hand in presence of two subscribing witnesses.

MAX ZAHN.

Witnesses:
 WOLDEMAR HAUPT,
 HENRY HASPER.